H. KOCOUREK.
SPRING STARTER FOR AUTOMOBILE ENGINES.
APPLICATION FILED DEC. 29, 1916. RENEWED AUG. 21, 1918.

1,280,241.

Patented Oct. 1, 1918.
2 SHEETS—SHEET 2.

Witness:

Inventor:
Henry Kocourek
by Burton & Burton
his Attys.

UNITED STATES PATENT OFFICE.

HENRY KOCOUREK, OF JERSEY CITY, NEW JERSEY, ASSIGNOR, BY MESNE ASSIGNMENTS, TO LEANDER H. LA CHANCE AND MARTIN TAYLOR, ADMINISTRATORS OF JOHN K. STEWART, DECEASED.

SPRING-STARTER FOR AUTOMOBILE-ENGINES.

1,280,241. Specification of Letters Patent. Patented Oct. 1, 1918.

Application filed December 29, 1916, Serial No. 139,451. Renewed August 21, 1918. Serial No. 250,891.

*To all whom it may concern:*

Be it known that I, HENRY KOCOUREK, a citizen of the United States, residing at Jersey City, in the county of Hudson and State of New Jersey, have invented new and useful Improvements in Spring-Starters for Automobile-Engines, of which the following is a specification, reference being had to the accompanying drawings, forming a part thereof.

The purpose of this invention is to provide an improved construction in the spring motor winding train and other features of a spring motor of the general character suitable for a spring starter for automobile engines. It consists in the elements and features of construction shown and described as indicated in the claims.

Figure 1:
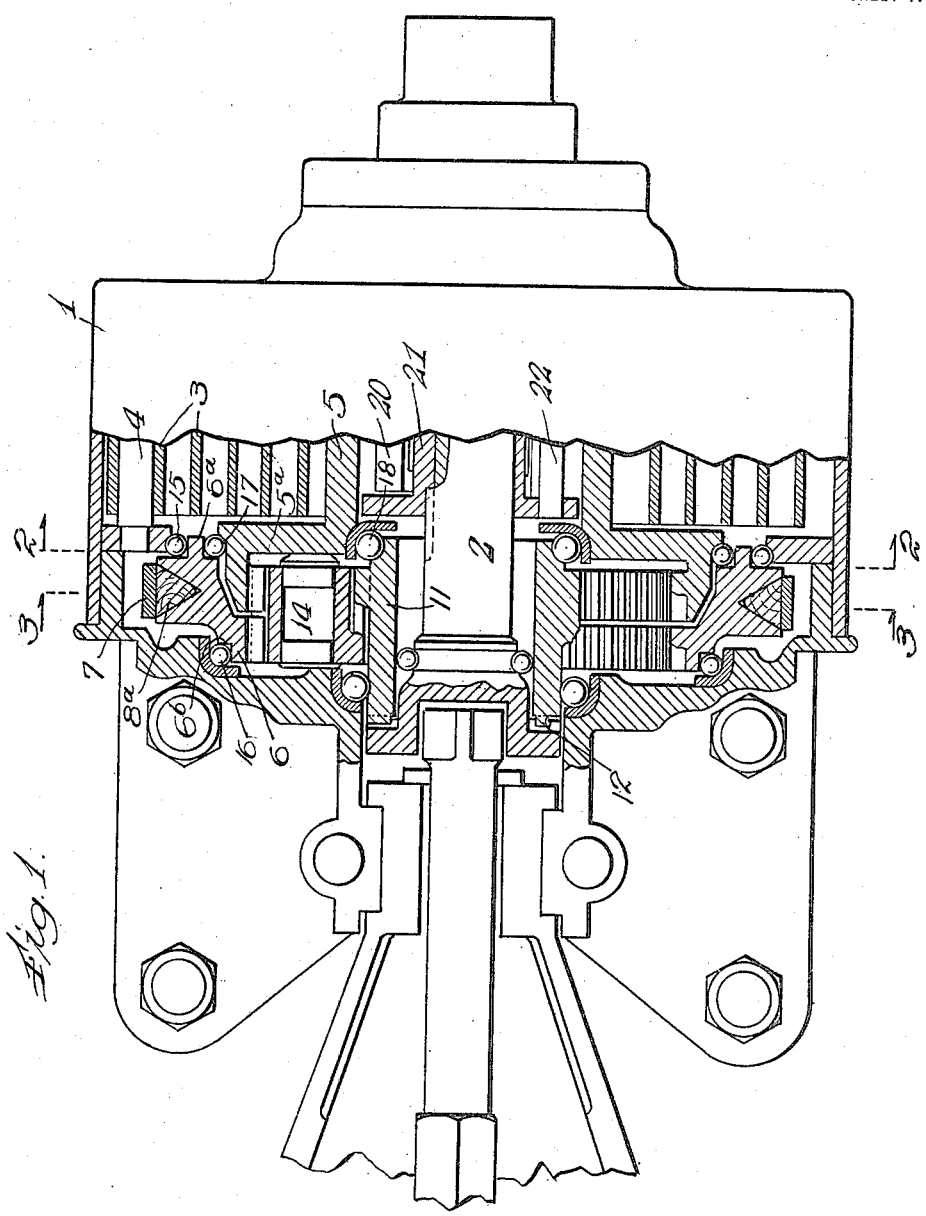
Figure 1 is an axial section of a spring starter embodying the features of this invention.
Figure 2:
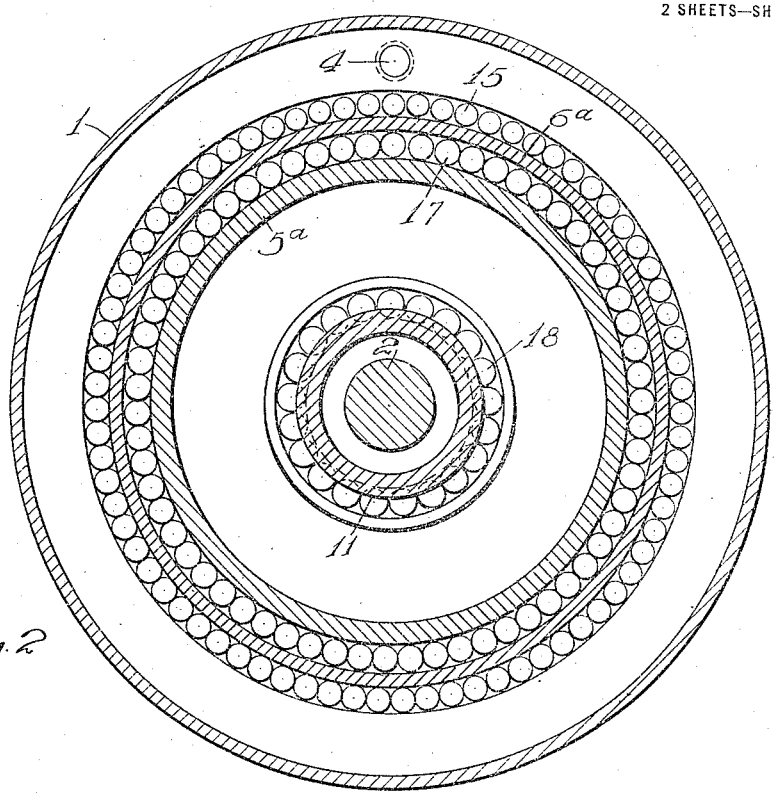
Fig. 2 is a section at the line, 2—2, on Fig. 1.
Figure 3:
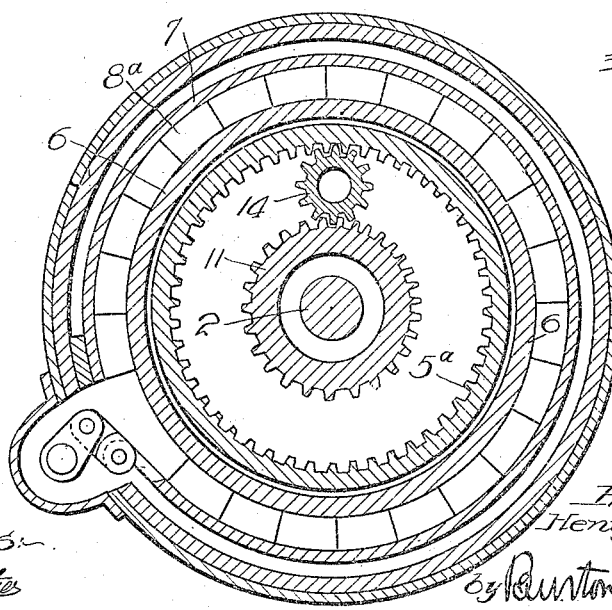
Fig. 3 is a section at the line, 3—3, on Fig. 1.

The general construction of the motor shown in the drawings is not herein claimed as my invention, but only the certain details of construction as will be specifically pointed out in connection with such brief description of the gentral structure as necessary to the understanding of these details.

In general the motor comprises the casing, 1, a centrally-situated power shaft and winding shaft, 2, a main power spring, 3, having its outer end anchored to the casing by means of the bolt, 4, and its inner end connected to a winding drum, 5, which is the hub of the final driven gear $5^a$, of a planetary gear train by which the motor spring is wound from the power shaft, 2, said planetary gear train being a speed-reducing train and having a master gear, 6, which is necessarily locked at rest in order to effect the winding, said locking being effected by a strap brake, 7, of familiar construction, having its shoes $8^a$, engaging the V-shaped groove in the periphery of said master gear. The drawings show in a general way at 12 one-way drive clutch connections between the spring mount or drum, 5, and the power shaft, 2, through which the spring in uncoiling rotates said power shaft, and other details of construction adapting the device to the purpose as a starter which is to have its motor spring wound by the running of the shaft which it starts by means of the clutch device partially shown at 20 and 21 and 22, for engaging the spring-winding drum, 5, with the central power and winding shaft, 2. These details of construction will not be specifically described, even though appearing in the drawings, except where necessary to the understanding of the specific features which constitute this invention.

The speed-reducing train from the shaft, 2, to the motor spring, 3, is a planetary gear train, as above stated, comprising the prime gear, 11, which when winding is clutched to the shaft, 2, by a one-way driving clutch whose engagement is seen at 12, said gear, 11, meshing with the planet pinion, 14, which in turn meshes with the two internal gears, one of which is the master gear, 6, above mentioned, and the other the final driven gear, $5^a$, above mentioned, of the same diameter at the gear pitch line, but differing in the number of their teeth by one, so that when the master gear is locked at rest by the brake, 7, the rotation of the shaft, 2, causes the planet pinion, 14, to travel around the axis of said shaft in the annular interval between said planet gear, 11, and the internally geared members, 6 and $5^a$, the difference of one in the number of the teeth on said internally geared members causing the final driven gear, $5^a$, to revolve in the reverse direction from the shaft a distance of one tooth in each complete planetary course of the pinion, 14, around the winding shaft, 2, thus slowly, in comparison with the speed of said shaft, 2, to wind up the spring. It is a vital principle in structures of this character and for the like purpose that the elements of the gear train encompassing the power shaft are not journaled upon that shaft, but are journaled so that their weight is carried, and the stress of their movements is borne, directly by the casing, leaving the central winding and power shaft free from any pressure which would bind it in its bearings, so that it is at all times free to move endwise while rotating either in winding or in being rotated by the spring. Similarly it is desirable that the intermediate elements of the train shall be so journaled and supported as not to impose pressure upon each other; and it is particularly important that the brake which is applied to the master gear for holding it at rest during winding shall not cause the master gear, by reason of the pressure of the brake upon it to experience any crowding toward or against the interior elements of the planetary train, such, for example, as that which would result if the pressure of the brake could crowd the master gear out of its perfectly concentric position with respect to the prime gear, 11, so that the planetary pinion, 14, would at one side of its orbit be pinched or bound tightly between said prime gear, 11, and the master gear, while at the other side it would have undue play between the two. In order to effectually prevent such binding action upon the train by the stress of the brake acting on the master gear, I provide the master gear with ball bearings in the casing, at two trans-axial planes at opposite sides of the plane of brake strap, such ball bearings being so positioned that the stress upon the ball seats is experienced in directly trans-axial plane, that is, without any side thrust; which insures the master gear against any lateral tipping or displacement which might cramp the train at any part and also insures that the full stress of the brake in clamping the master gear is transmitted directly to the case and is not transmitted to any of the intermediate or coöperating parts of the train, which are thereby rendered certain to maintain their proper relations to the master gear and to each other for their free coöperation with each other both in the winding and in the driving action. The two ball bearings referred to are shown at 15 and 16, respectively, the balls at 15 obtaining their inner circumferential seat upon the outer circumference of an annular flange, 6ª, on the back of the master gear, and the balls of the bearing, 16, obtaining their seat on the master gear upon an outwardly-facing shoulder, 6ᵇ, at the opposite side of the master gear from said annular flange, 6ª. The concentric relation of the final driven gear, 5ª, with respect to the master gear, 6, which it is necessary to preserve in order to prevent any pinching of the planet pinion, 14, between the said final gear and the prime gear, 11, is insured by providing said final driven gear, 5ª, with a ball bearing at 17, upon the inner circumference of the same annular flange, 6ª, upon whose outer circumference the balls of the bearings, 15, are seated. And similarly the concentric relation of the final driven gear with the planet gear, 11, is insured by providing ball bearings between the two at 18, in the same directly trans-axial plane with the ball bearings, 17, and the ball bearings, 15, so that all pressures operating laterally upon any of the three elements thus concentrically situated are received and transmitted in the same trans-axial plane, directly outward to the casing, avoiding any liability of deflection of any of the parts out of their true planes by reason of these stresses or pressures.

I claim:—

1. In a spring motor comprising a casing, a central power shaft, a motor spring and a planetary gear train for winding the spring from the central power shaft, in combination with the casing and the master gear of the planetary train, a brake-band secured to the casing and encompassing the master gear for locking it at rest during winding, the master gear having bearings on the casing at opposite sides of the transaxial plane of the brake band.

2. In a spring motor comprising a casing, a central power shaft, a motor spring and a planetary gear train for winding the spring from the central power shaft, in combination with the casing and the master gear of the planetary train, a brake-band secured to the casing and encompassing the master gear for locking it at rest during winding, the master gear having exteriorly thereof bearings on the casing at opposite sides of the transaxial plane of the brake band.

3. In a spring motor comprising a casing, a central power shaft, a motor spring and a planetary gear speed-reducing train for winding the spring from the central power shaft, in combination with the master gear of the planetary train, a brake-band secured to the casing encompassing the master gear for locking it at rest during winding, the master gear having exteriorly thereof ball bearings on the casing at opposite sides of the transaxial plane of the brake band, and the final driving gear of the speed-reducing train having exteriorly of said final gear, bearings in the master gear, said bearings being in the trans-axial plane of one of the bearings of the master gear on the casing.

4. In a spring motor comprising a casing, a central power shaft, a motor spring and a planetary speed-reducing gear train for winding the spring from the central power shaft, in combination with the casing and the master gear of the planetary gear train, a brake-band secured to the casing encompassing the master gear for locking it at rest during winding, the master gear having an annular flange at one side, bearings for the master gear on the casing at the outer circumference of said annular flange, bearings for the final gear of the speed-reducing train on the inner circumference of said flange of the master gear, said two bearings being in the same trans-axial plane.

In testimony whereof, I have hereunto set my hand this 24th day of November, 1916.

HENRY KOCOUREK.